(12) United States Patent
Yu et al.

(10) Patent No.: US 11,546,291 B1
(45) Date of Patent: Jan. 3, 2023

(54) FQDN (FULLY QUALIFIED DOMAIN NAME) ROUTES OPTIMIZATION IN SDWAN (SOFTWARE-DEFINED WIDE AREA NETWORKING)

(71) Applicant: Fortinet, Inc., Sunnyvale, CA (US)

(72) Inventors: Kun Yu, San Jose, CA (US); Yanheng Wei, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/521,814

(22) Filed: Nov. 8, 2021

(51) Int. Cl.
*H04L 12/725* (2013.01)
*H04L 12/717* (2013.01)
*H04L 12/721* (2013.01)
*H04L 61/4511* (2022.01)
*H04L 61/5007* (2022.01)
*H04L 61/5046* (2022.01)
*H04L 67/56* (2022.01)

(52) U.S. Cl.
CPC ...... *H04L 61/4511* (2022.05); *H04L 61/5007* (2022.05); *H04L 61/5046* (2022.05); *H04L 67/56* (2022.05)

(58) Field of Classification Search
CPC ............ H04L 61/4511; H04L 61/5007; H04L 61/5046; H04L 67/56
See application file for complete search history.

(56) References Cited

U.S. PATENT DOCUMENTS

| 7,006,472 | B1* | 2/2006 | Immonen | H04L 47/824 |
| | | | | 370/332 |
| 2021/0352045 | A1* | 11/2021 | Kodavanty | H04L 67/1008 |
| 2021/0352138 | A1* | 11/2021 | Kodavanty | H04L 41/40 |

* cited by examiner

*Primary Examiner* — Christopher B Robinson
(74) *Attorney, Agent, or Firm* — Law Office Of Dorian Cartwright; Dorian Cartwright

(57) ABSTRACT

A DNS (Domain Name Server) proxy is configured as a DNS server for clients on the enterprise network to send two or more DNS queries to collect each available IP addresses on a SDWAN member link. IP address collection can be responsive to receiving a DNS request from a client for assigning a FQDN (Fully Qualified Domain Name). Service quality can be evaluated for the service on each member link of the IP addresses. An IP address is assigned to the client based on the service quality evaluation. A notification is transmitted to the client in a DNS response to the IP address request, with the chosen IP address information for configuration.

18 Claims, 6 Drawing Sheets

FQDN (FULLY QUALIFIED DOMAIN NAME) ROUTES OPTIMIZATION IN SDWAN (SOFTWARE-DEFINED WIDE AREA NETWORKING)

FIELD OF THE INVENTION

The invention relates generally to computer networking, and more specifically, for administering an SDWAN for an enterprise network over a data communication network by assigning resolved IP addresses based on evaluating all IP addresses that are available for services.

BACKGROUND

As CDN (Content Delivery Network) is used widely across the Internet for fast delivery of network content, FQDN (Fully Qualified Domain Name) and DNS (Domain Name Service) are used by ISPs (Internet Service Providers) to provide best quality service in network. The FQDN provides a location for users to reach resources available over the Internet. A numeric IP address is typically translated from text entered as a URL (Universal Resource Locator). Furthermore, the FQDN is required for SSL (Secure Socket Layer) network security features.

When a SDWAN customer is trying to access an Internet service, it must first do DNS query to get a service IP address. At this time, SDWAN device does not have any IP address information, and will send DNS request to a DNS server based on priority of DNS server list in system.

Problematically, the IP address from the first responded DNS server will be used as IP address of this service. Then SDWAN device will evaluate service quality to the first responded IP address via available uplinks. Consequently, the first qualified IP address rather than the best qualified IP address is conventionally assigned to clients, potentially affecting performance.

Therefore, what is needed is a robust technique for administering an SDWAN for an enterprise network over a data communication network by assigning resolved IP addresses based on evaluating all IP addresses that are available for services.

SUMMARY

These shortcomings are addressed by the present disclosure of methods, computer program products, and systems for administering an SDWAN for an enterprise network over a data communication network by assigning resolved IP addresses based on evaluating all IP addresses that are available for services.

In one embodiment, a DNS proxy is configured as a DNS (Domain Name Server) server for clients on the enterprise network to send two or more DNS queries to collect each available IP addresses on a SDWAN member link. IP address collection can be responsive to receiving a DNS request from a client for assigning a FQDN (Fully Qualified Domain Name). Service quality can be evaluated for the service on each member link of the IP addresses.

In another embodiment, an IP address is assigned to the client based on the service quality evaluation. A notification is transmitted to the client in a DNS response to the IP address request, with the chosen IP address information for configuration.

Advantageously, computer network performance is improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for administering an SDWAN for an enterprise network over a data communication network by assigning resolved IP addresses based on evaluating all IP addresses that are available for services.

One of ordinary skill in the art will recognize many additional variations made possible by the succinct description of techniques below.

I. Systems for Selecting Optimal IP Address on SDWAN Uplinks (FIGS. 1-4)

Figure 1:
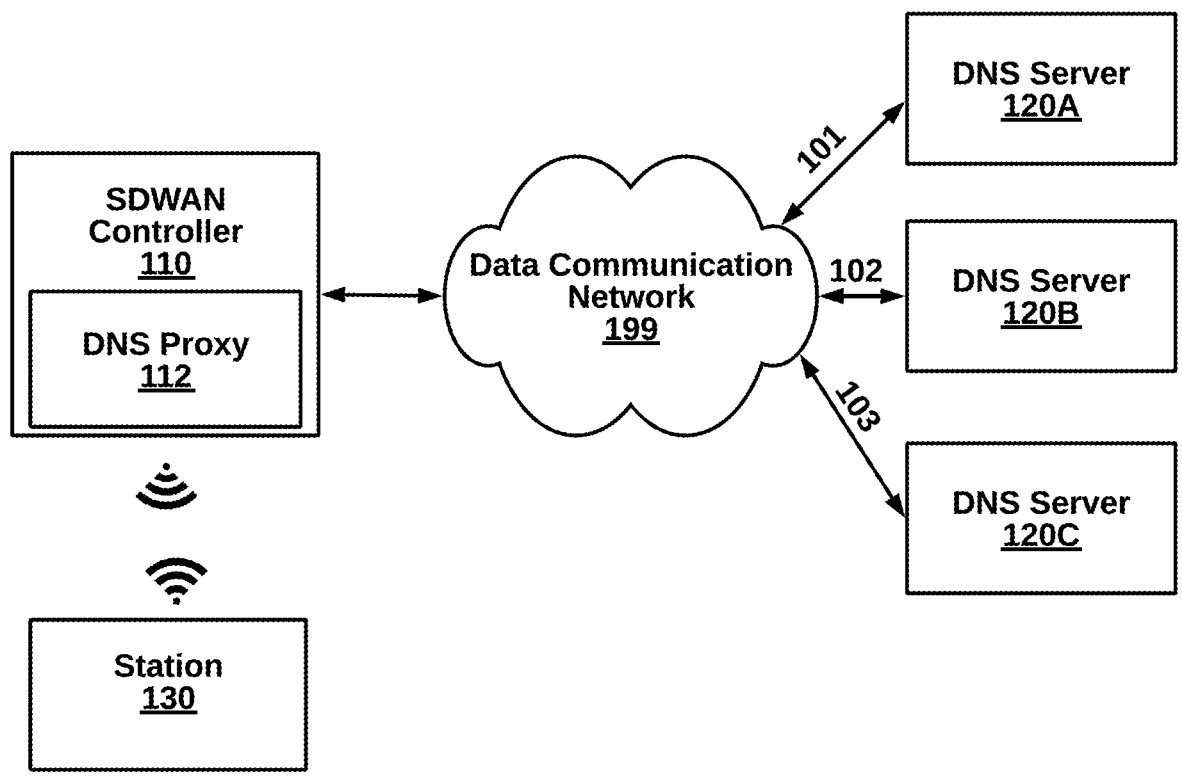
FIG. 1 is a high-level block diagram illustrating a system for administering an SDWAN for an enterprise network over a data communication network (e.g., multiple ISP networks or the Internet) by assigning resolved IP addresses based on evaluating all IP addresses that are available for services, according to an embodiment.

FIG. 1 is a high-level illustration of a system 100 for administering an SDWAN for an enterprise network over a data communication network by assigning resolved IP addresses based on evaluating all IP addresses that are available for services, according to an embodiment. An SDWAN controller 110 is coupled to station 130 and multiple DNS servers 120A,B,C with uplinks 101, 102, 103, respectively, over a data communication network 199 comprising multiple ISP data networks each connected to an uplink.

The components of the system 100 (cannot find 100 in FIG. 1) are coupled in communication over the data communication network 199. Preferably, the SDWAN controller 110 is connected to the data communication system via hard wire, such as Ethernet, DSL, or LTE. The station 130 can be connected indirectly via wireless connection. The data communication network 199 can be any data communication network such as a WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the SDWAN controller 110 further includes a DNS proxy 112 to determine a best IP address of all available IP addresses on the multiple uplinks 101, 102, 103.

Figure 2:
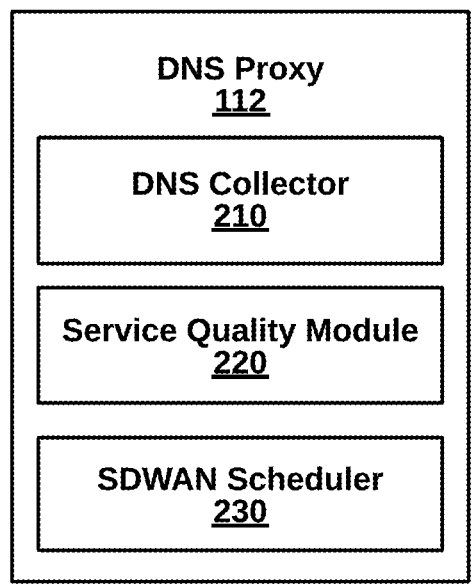
FIG. 2 is a more detailed block diagram illustrating a DNS proxy of the system of FIG. 1, according to one preferred embodiment.
Figure 3:
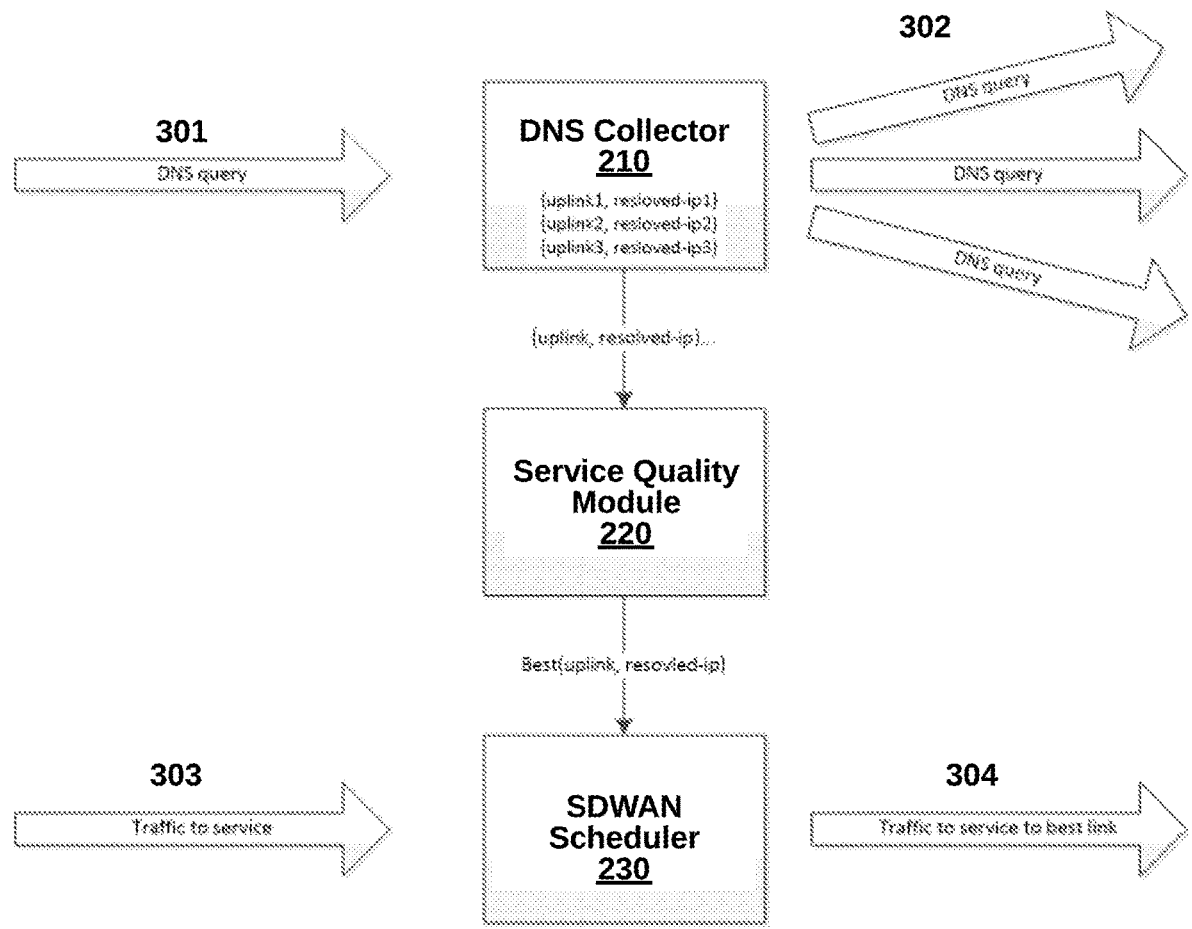
FIGS. 3 and 4 is a sequence diagram illustrating interactions between the components of the system of FIG. 1, according to some embodiments.
Figure 4:
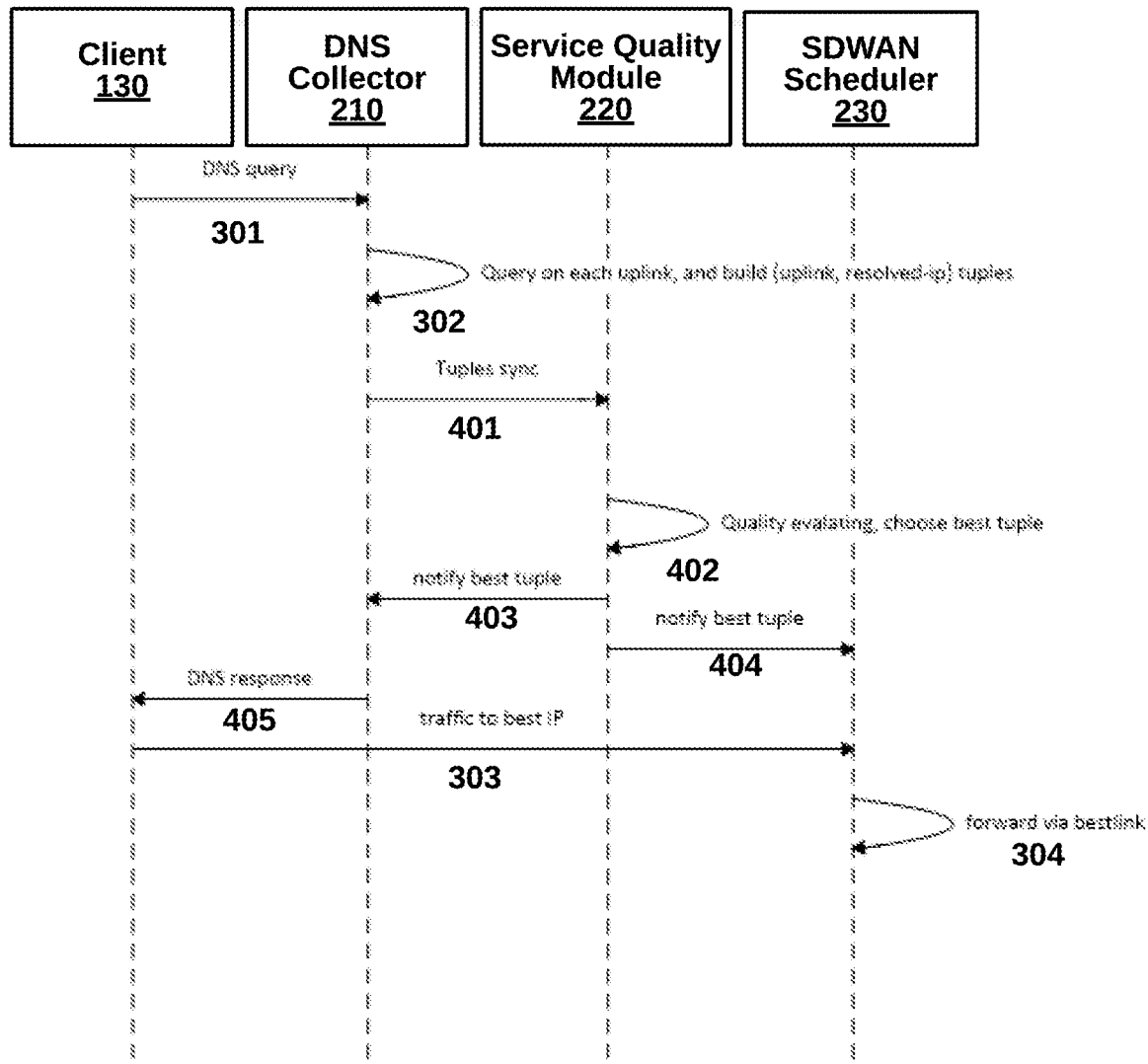

FIG. 2 is a more detailed block diagram illustrating the SDWAN controller 110 of the system of FIG. 1, according to one preferred embodiment. The SDWAN controller 110 comprises a DNS collector 210, a service quality monitor 220, and a SDWAN scheduler 230.

The DNS collector 210 configured as a DNS (Domain Name Server) server for clients on the enterprise network to send two or more DNS queries 302 to collect each available IP addresses on a SDWAN member link, responsive to receiving a DNS request 301 from a client for assigning a FQDN (Fully Qualified Domain Name). IP addresses are stored as tuples formatted with an uplink identifier and associated IP address 401.

The service quality monitor 220 to evaluate service quality for the service on each member link the IP addresses 402, 403, 404.

The SDWAN scheduler 230 to assign an IP address for based on the service quality evaluation and transmit notification to the client 405 in a DNS response of the IP address. As a result, network traffic 303 from the client 130 is sent to the best link 304.

II. Methods for Selecting Optimal IP Address on SDWAN Uplinks (FIG. 5)

Figure 5:
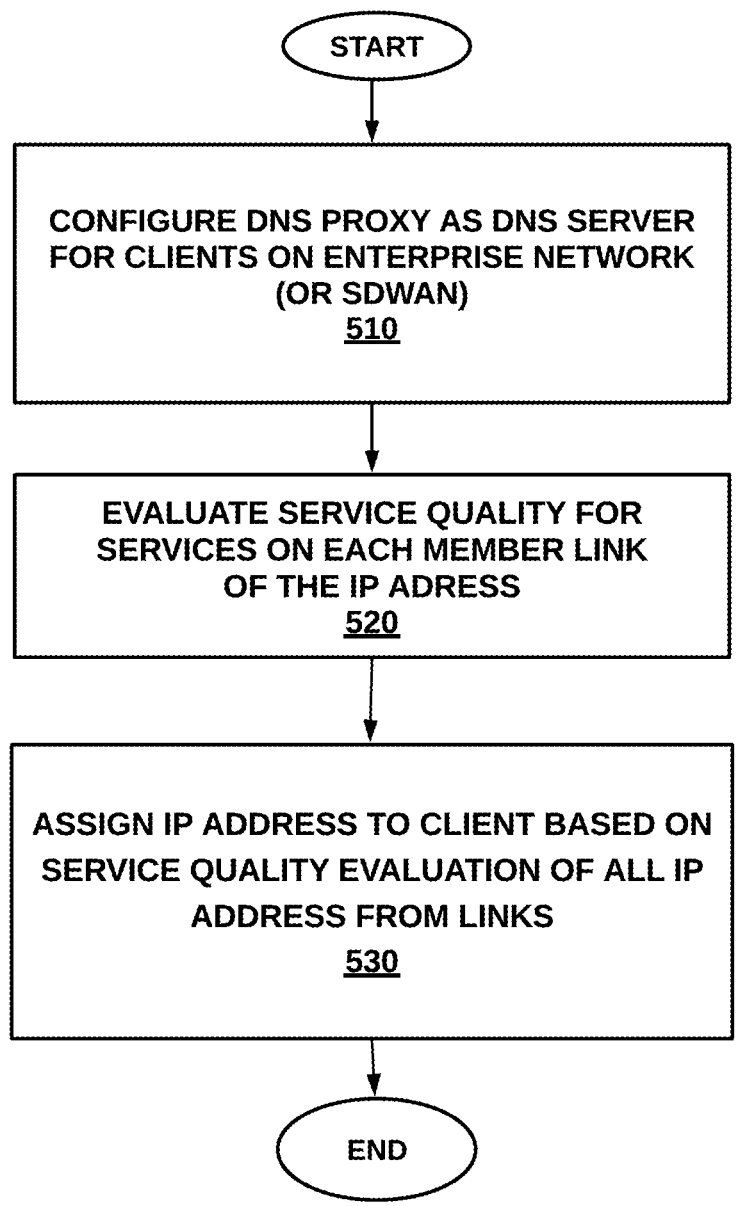
FIG. 5 is a high-level flow diagram illustrating a method for administering an SDWAN for an enterprise network over a data communication network by assigning resolved IP addresses based on evaluating all IP addresses that are available for services, according to some embodiments.

FIG. 5 is a high-level flow diagram illustrating a method 500 for administering an SDWAN for an enterprise network over a data communication network by assigning resolved IP addresses based on evaluating all IP addresses that are available for services, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 510, a DNS proxy is configured as a DNS (Domain Name Server) server for clients on the enterprise network to send two or more DNS queries to collect each available IP addresses on a SDWAN member link. IP address collection can be responsive to receiving a DNS request from a client for assigning a FQDN (Fully Qualified Domain Name).

At step 520, service quality is evaluated for the service on each member link of the IP addresses. The evaluation can include availability, packet loss, latency, jitter, and the like.

At step 530, an IP address is assigned to the client based on the service quality evaluation. A notification is transmitted to the client in a DNS response to the IP address request, with the chosen IP address information for configuration.

III. Generic Computing Environment

Figure 6:
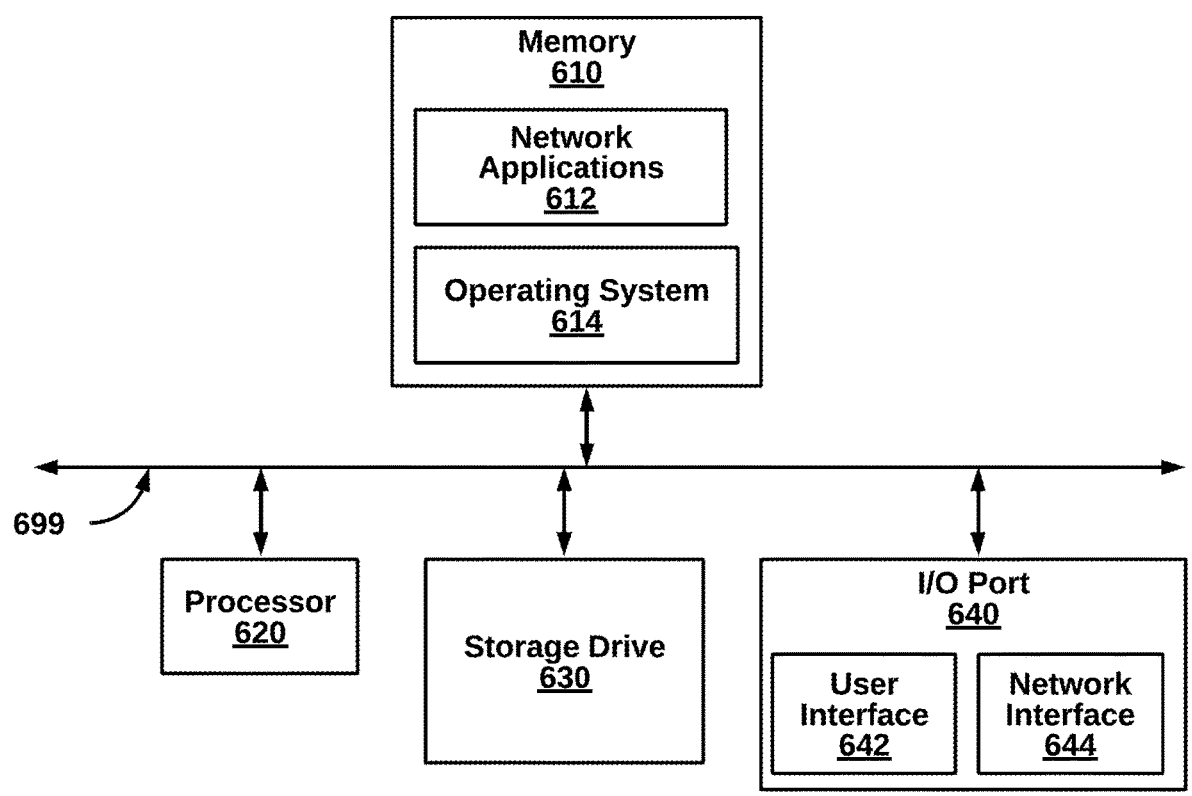
FIG. 6 is a general computing environment for implementing the system of FIG. 1, according to an embodiment.

FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., SDWAN controller 110, DNS server 120A, B,C, client 130, an access point, a firewall device, a gateway, a router, or a wireless station).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 605 or the storage drive 630.

The storage drive 630 can be any non-volatile type of storage such as a magnetic disc, EEPROM (electronically erasable programmable read-only memory), Flash, or the like. The storage drive 230 stores code and data for applications.

The I/O port 640 further comprises a user interface 642 and a network interface 644. The user interface 642 can output to a display device and receive input from, for example, a keyboard. The network interface 644 (e.g., an RF antennae and/or Ethernet jack) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network (e.g., 3G/4G/5G), or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An SDWAN (Software-Defined Wide Area Network) controller to administer an SDWAN for an enterprise network over a data communication network by assigning resolved IP addresses based on evaluating all IP addresses that are available for services, the SDWAN server comprising:
   a processor;
   a network interface communicatively coupled to the data communication network and to the enterprise network; and
   a memory, communicatively coupled to the processor and storing:
      a DNS proxy configured as a DNS (Domain Name Server) server for clients on the enterprise network to send a DNS query on two or more uplinks to collect each of the available IP addresses on a SDWAN member link, responsive to receiving a DNS request from a client for assigning a FQDN (Fully Qualified Domain Name), and to receive a response from the two or more uplinks;
      a service quality monitor to evaluate service quality for the service for the IP addresses of the two or more uplinks; and
      a SDWAN scheduler to assign an IP address based on the service quality evaluation and transmit notification to the client in a DNS response of the IP address, wherein a cache of the DNS proxy stores the assigned IP address along with an uplink identifier in a tuple format.

2. The SDWAN controller of claim 1, wherein the service quality comprises evaluations of at least availability, packet loss, latency and jitter.

3. The SDWAN controller of claim 1, wherein the DNS proxy updates the cache with the chosen IP address that has been resolved for the client.

4. The SDWAN controller of claim 1, wherein the SDWAN scheduler installs SDWAN rules to choose the best uplink.

5. The SDWAN controller of claim 1, wherein the chosen IP address does not currently have a highest service quality.

6. The SDWAN controller of claim 1, wherein two or more IP addresses are provided responsive to the two or more DNS queries, and the chosen IP address is not a first response from the two or more DNS queries.

7. A method in a SDWAN (Software-Defined Wide Area Network) controller for an enterprise network over a data communication network by assigning resolved IP addresses based on evaluating all IP addresses that are available for services, the method comprising the steps of:
   configuring a DNS proxy as a DNS (Domain Name Server) server for clients on the enterprise network to send a DNS query on two or more uplinks to collect each of the available IP addresses on a SDWAN member link, responsive to receiving a DNS request from a client for assigning a FQDN (Fully Qualified Domain Name), and to receive a response from the two or more uplinks; and
   evaluating service quality for the service for the IP addresses of the two or more uplinks; and
   assigning an IP address for based on the service quality evaluation and transmit notification to the client in a DNS response of the IP address, wherein a cache of the DNS proxy stores the assigned IP address along with an uplink identifier in a tuple format.

8. The method of claim 7, wherein the service quality comprises evaluations of at least availability, packet loss, latency and jitter.

9. The method of claim 7, wherein the DNS proxy updates a cache with the chosen IP address that has been resolved for the client.

10. The method of claim 7, wherein the SDWAN scheduler installs SDWAN rules to choose the best uplink.

11. The method of claim 7, wherein the chosen IP address does not currently have a highest service quality.

12. The method of claim 7, wherein two or more IP addresses are provided responsive to the two or more DNS queries, and the chosen IP address is not a first response from the two or more DNS queries.

13. A non-transitory computer-readable media in a SDWAN (Software-Defined Wide Area Network) controller, implemented at least partially in hardware for, when executed by a processor, administering an SDWAN for an enterprise network over a data communication network by assigning resolved IP addresses based on evaluating all IP addresses that are available for services, the method comprising the steps of:

configuring a DNS proxy as a DNS (Domain Name Server) server for clients on the enterprise network to send a DNS query on two or more uplinks to collect each of the available IP addresses on a SDWAN member link, responsive to receiving a DNS request from a client for assigning a FQDN (Fully Qualified Domain Name), and to receive a response from the two or more uplinks; and evaluating service quality for the service for the IP addresses of the two or more uplinks; and assigning an IP address for based on the service quality evaluation and transmit notification to the client in a DNS response of the IP address, wherein a cache of the DNS proxy stores the assigned IP address along with an uplink identifier in a tuple format.

14. The computer-readable media of claim 13, wherein the service quality comprises evaluations of at least availability, packet loss, latency and jitter.

15. The computer-readable media of claim 13, wherein the DNS proxy updates a cache with the chosen IP address that has been resolved for the client.

16. The computer-readable media of claim 13, wherein the cache of the DNS proxy stores the chosen IP address along with an uplink identifier in the format of a tuple.

17. The computer-readable media of claim 13, wherein the SDWAN scheduler installs SDWAN rules to choose the best uplink.

18. The computer-readable media of claim 13, wherein the chosen IP address does not currently have a highest service quality.

* * * * *